Nov. 23, 1965     D. E. PEDERSON     3,219,792
ELECTRON BEAM VACUUM WELDING SYSTEM
WITH WALKING SEAL

Filed July 23, 1963     3 Sheets-Sheet 1

INVENTOR.
D. E. PEDERSON

BY George E. Pearson

ATTORNEY

United States Patent Office 3,219,792
Patented Nov. 23, 1965

3,219,792
ELECTRON BEAM VACUUM WELDING SYSTEM
WITH WALKING SEAL
Donald E. Pederson, Chula Vista, Calif., assignor to Rohr Corporation, Chula Vista, Calif., a corporation of California
Filed July 23, 1963, Ser. No. 297,096
15 Claims. (Cl. 219—117)

This invention relates generally to electron beam welding outside the high vacuum environment of the electron gun and more particularly to a welding system and method having provision for progressive welding along the surface of a workpiece while maintaining the beam within a reduced vacuum and protecting gaseous environment in the region of impingement of the beam with the workpiece.

The present invention incorporates the buffer chamber and sealed workbox concepts disclosed and claimed in the copending application of D. C. Kalbfell, Serial No. 273,156, filed April 15, 1963, for bringing the beam through a plurality of buffer chambers and into a protective gaseous environment at atmosphere pressure in the region of the workpiece, or selectively for bringing the beam through the buffer chamber and into a workbox having such a protective atmosphere at a partial vacuum and having a releasably sealed engagement with the final buffer chamber.

It is a broad object of the present invention to provide a new and improved method and system for electron beam welding which avoids the beam losses incident to operation of the beam at atmospheric pressure while also avoiding the physical dimensional and immobility limitations incident to welding with the beam in a sealed workbox maintained at partial vacuum.

It is a more specific object of the present invention to provide a method and system for electron beam welding within a partial vacuum and protective gaseous environment in the region of impingement of the beam with the workpiece while also providing a walking seal for the chamber enclosing this environment whereby the electron beam welder and workpiece may be moved relative to each other to permit continuous and progressive welding of the workpiece as the beam advances therealong.

Another object is to provide a new and improved method and system for effecting a walking vacuum seal with the surface of a workpiece.

Yet another object is to combine vacuum buffer chamber, sealed workbox, and walking seal principles, techniques and features to provide an electron beam system for welding within a partial vacuum outside the high vacuum environment of the electron gun while also providing for advance of the beam along the workpiece.

Still another object resides in the provision of an electron beam welding system and method utilizing the buffer chamber concept to shield the electron gun chamber from atmospheric pressure while welding with the beam at partial vacuum within an intermediate buffer chamber.

These and other objects will become more clearly apparent from the following description of a preferred embodiment of the invention which has been constructed in accordance with the best mode thus far devised for practicing the principles of the invention, reference being had to the accompanying drawings wherein:

FIG. 1 is a schematic view of one of the electron beam welding systems disclosed in the aforesaid copending application of D. C. Kalbfell;

Figure 1:
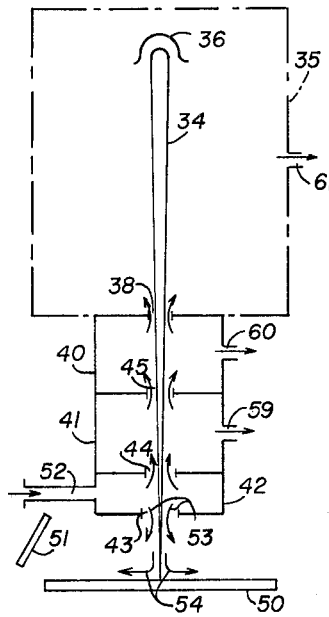

Referring now to the drawings for a more complete understanding of the invention, and first more particularly to FIG. 1 thereof, there is shown thereon an electron beam welding system of the type disclosed and claimed in the aforesaid copending application of D. C. Kalbfell for Non-Vacuum Environmentally Controlled Electron Beam Welding, Serial No. 273,156, filed April 15, 1963. In accordance with the inventive concept and arrangement of parts therein disclosed, the electron beam 34 is generated in the usual manner from an electron emitter 36 and associated apparatus within a gun chamber 35 which is exhausted by way of exit orifice 61 to a high vacuum of the order of 0.1 micron ($10^{-4}$ mm. Hg) by means of a pumping system such, for example, as an oil diffusion pump (not shown), having a capacity of 100 liters per second at 0.1 micron when operated into a suitable rotary force pump (also not shown).

Beam 34 is directed onto the workpiece 50 at atmospheric pressure and surrounded by a protective gas such as helium. In order to bring the beam from the high vacuum and low pressure condition of gun chamber 35 into the greatly increased pressure of the atmosphere at the workpiece 50, while maintaining the same capacity pumping system as heretofore described for the gun chamber, a pair of buffer chambers 40 and 41 and a helium injection chamber 42 are employed. In this arrangement, the beam leaves the gun chamber through an exit orifice 38 and thence passes through the buffer chamber exit orifices 45 and 44 and finally through the helium chamber orifice 43 into the atmosphere in the region of the workpiece 50.

Orifices 38, 45, 44 and 43 are mechanically aligned for passage of beam 34 therethrough or alternatively, these orifices are initially burned through metal diaphragms or inserts provided in Pyrex windows located at the orifices for visual optical purposes when this is desired or required. Orifices 44, 45 and 38 are assumed to have diameters each of the order of 0.020 inch, based on beam 34 having a diameter of from 0.007 to 0.010 inch. Exit orifice 43 for helium chamber 42, however, is assumed to have a much larger diameter of the order of 0.30 inch.

Helium gas at or above atmospheric pressure is introduced into chamber 42 by way of inlet 52 therein and leaves the chamber by way of exit orifice 43 in surrounding relation to electron beam 34, as depicted by the arrows 53. The helium gas then bathes the workpiece 50 in the region of impingement of the beam therewith as depicted by the arrows 54. The gas flow rate is assumed to be of the order of 20 ft.$^3$/hour which corresponds to the flow required for ordinary TIG welding wherein the inert gas flows through an electrode holder and is discharged through an annular orifice around the electrode. The flow rate for helium through a 0.38-inch O.D. orifice using a 0.40-inch diameter electrode is approximately 20 ft.$^3$/hour. Accordingly, exit orifice 43 for helium chamber 42 is given the corresponding diameter of 0.30 inch, as aforementioned.

Buffer chamber 40 is exhausted separately through orifice 60, as by a rotary force pump (not shown) having an actual nominal capacity of 10 c.f.m., and having an estimated operating speed of 5.59 c.f.m., at an assumed chamber pressure of 0.1 mm. Hg, or 2.78 liters/second at the assumed chamber pressure of 0.1 mm. Hg and for the assumed 0.020 inch diameter of beam exit orifice 45 of chamber 40. Similarly, chamber 41 is exhausted separately through orifice 59, as by a rotary force pump (not shown) having an actual nominal capacity of 20 c.f.m., and having an estimated operating speed of 17 c.f.m., at an assumed chamber pressure of 5 mm. Hg and for the assumed 0.020 diameter of beam exit orifice 44 of chamber 41.

In accordance with this buffer chamber technique, the flow into each buffer chamber is sonic limited at the orifice, and the flow out of each chamber is the sum of its pump capacity and the flow through the next orifice into the next chamber of increased vacuum. For equilibrium flow conditions, after operating pressures in the vacuum chambers have been reached the weight flow into each chamber equals the weight flow out of the chamber. As a result of this arrangement and the assumed orifice diameters, pressures and pumping speeds for vacuum chambers 35, 40 and 41, there is an estimated flow (as depicted by the arrows in the orifices) of 58 liters/second of helium into the gun chamber 35 whose pumping system has the aforementioned nominal capacity of 100 liters per second at the assumed pressure of $10^{-4}$ mm. Hg. This leaves 42 liters/second pump capacity for the leakage of chamber 35 other than through its beam exit orifice 38.

When the electron beam is traveling through helium at atmospheric pressure, the distance should be less than 1 inch. When the beam is traveling through a workbox, or the like, at reduced pressure, the range may be extended inversely as the ratio of the workbox pressure to atmospheric pressure.

The distance an electron could travel in helium at standard atmospheric pressure and temperature is about 4 inches at 30 kv. potential. For one inch travel in helium, there would be approximately 25% power loss. Since more than 25% power loss might seriously impair the welding capabilities of the machine, one inch is considered to be a practical maximum distance.

Appropriate shielding depicted at 51 is employed in this region for the protection of operating personnel. For operating potentials of 15 kv. or less, the X-rays generated by the electron beam striking the workpiece are "soft," of long wave length, of low intensity and do not present a radiation hazard to nearby personnel. Above 15 kv. potential, hard X-rays of short wave length and high intensities are emitted. The intensity increases with increase in potential. The hard rays are more penetrating and present a radiation hazard to operating personnel.

In a modification of the welding system of FIG. 1, as disclosed in the aforesaid application of D. C. Kelbfell, but not herein disclosed, the beam passes through the orifice in the final buffer chamber and impinges on a workpiece disposed within an open top workbox which is releasably sealed to the final buffer chamber and into which helium is injected. The workbox is maintained at a partial vacuum and thus the work may be maintained at a considerably greater distance from the final orifice than in the FIG. 1 arrangement since the beam losses in the helium are reduced at the reduced pressure of the partial vacuum in the workbox. The workbox concept provides accessibility to the workpiece by removal of the workbox and without requiring that the pumping system for the electron gun and buffer chambers be shut down. The physical dimensional limitations of the workbox, however, limits the size of the workpiece insertable into the workbox and prevents mobility of the welder with respect to the workpiece.

Figure 3:
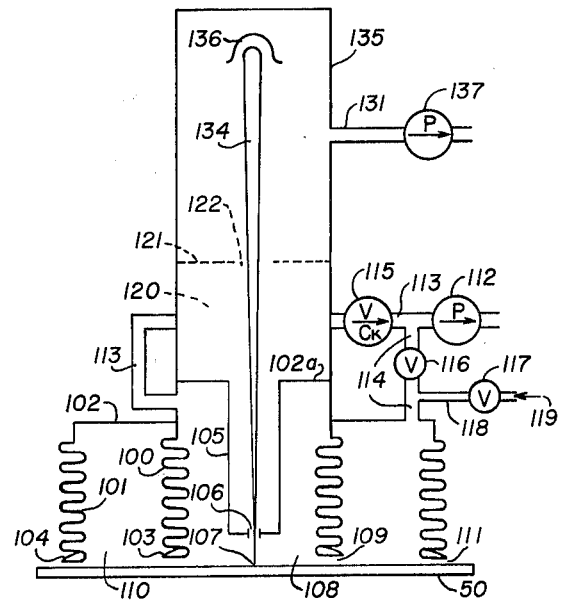
FIG. 3 is a schematic view of the electron beam welding system of the present invention.
Figure 2A:
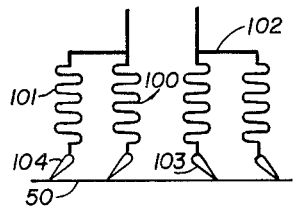
FIGS. 2a to 2c are schematic views showing the walking action of the walking seal employed in the present invention.
Figures 2B, 2C:
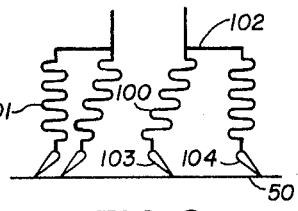

The beam losses incident to welding with the beam in the helium gas at atmospheric pressure, as in FIG. 1, and the aforementioned dimensional and immobility limitations of the workbox arrangement are substantially avoided by the welding system of FIG. 3 which combines the buffer chamber and workbox features with the walking vacuum seal feature and concept disclosed in FIGS. 2a to 2c.

Referring first to FIG. 2a, there is disclosed therein, inner and outer vacuum cups having cylindrical walls in the form of bellows 100 and 101 which are joined at and depended from a common base 102. The open ends of bellows 100, 101 terminate in flexible and resilient peripheral end surfaces 103 and 104 respectively whereby the bellows are adapted to develop a vacuum seal with a work surface engaged thereby. The flexible walls of the bellows, moreover, permit limited lateral movement of the sealing end surfaces 103 and 104 parallel to the base 102 and in sliding movement over the work surface whenever the vacuum seal in the cups is broken.

By reason of the aforedescribed vacuum cup arrangement, the unitary bellows structure of FIG. 2a may be caused to walk relative to a work surface as depicted by the change in position of the bellows in FIGS. 2b and 2c. The manner in which this change in position is accomplished will presently be described.

Assume first that a vacuum is drawn within the chamber defined by bellows 100 and 101 in engagement with the work surface 50 as in FIG. 2a, namely, the outer chamber. This causes a vacuum seal to develop between end surface 104 and the work surface, but not between end surface 103 and the work surface, with the result that the vacuum is also drawn within the chamber defined by bellows 100, namely, the inner chamber. Assume now that work surface 50 is moving to the left, as viewed in FIGS. 2a to 2c, and that base 102 remains stationary. Surface 104, being sealed to surface 50, thus moves with the work surface as bellows 101 flexes, whereas surface 103 merely slides over the work surface to hold its position, as depicted in FIG. 2b.

Assume now that the vacuum within the outer chamber is reduced to near atmospheric pressure surrounding bellows 101 with the result that a vacuum seal develops between bellows surface 103 and the work surface as the pressure differential develops between the inner and outer chambers, and with the further result that the vacuum seal of the surface 104 breaks as the pressure within the outer chamber nears atmospheric pressure. As the vacuum seal develops on surface 103, bellows 100 flexes and surface 103 moves with the work surface to the position depicted in FIG. 2c. When the vacuum seal breaks under surface 104, bellows 101 is released to move to its initial position, and surface 104, accordingly, slides over the work surface to its initial position, as depicted in FIG. 2c.

Assume now that the vacuum is restored within the outer chamber to near equality with the vacuum which has been maintained within the inner chamber. As the vacuum develops in the outer chamber, the vacuum seal is developed on surface 104 and the same moves with the work surface with accompanying flexing of bellows 101 as in FIG. 2b. As the vacuum within the outer chamber nears equality with the vacuum within the inner chamber, the vacuum seal between surfaces 103 and 50 becomes broken to permit bellows 100 to return to its initial position as depicted in FIG. 2b, accompanied by sliding of end surface 103 over work surface 50 to this position.

With the bellows having moved from the position of FIG. 2b to the position of FIG. 2c, and then back to the position of FIG. 2b, as aforedescribed, a complete walking cycle of the bellows relative to surface 50 has been completed, and this cycle is repeated as long as it is desired to continue movement of the work surface with respect to the bellows. As otherwise expressed, this cyclic stepping movement may be brought about as a result of maintaining the vacuum within the inner bellows chamber and alternately reducing and restoring the vacuum within the outer bellows chamber to near atmospheric pressure and to near equality with the vacuum of the inner chamber respectively, thereby alternately to release the vacuum seals on the end surfaces of the bellows in engagement with the work surface whereby the flexed bellows are free to return each to its initial position with accompanying sliding movement of its released end surface over the work surface. It will be understood, moreover, that whereas in the foregoing, the cyclic action is described with reference to a work surface in continuous motion, a similar cyclic action of the bellows will occur when the work surface is stationary and the bellows is moved continuously as a unit with respect to the work surface.

Referring now to FIG. 3, the beam is designated 134, and the electron gun for producing the beam is depicted by the emitter 136. The electron beam chamber is designated 135 and is maintained at a high vacuum of the order of $10^{-4}$ mm. Hg by a diffusion pump 137 acting through the duct 131.

The base 102 for bellows 100 and 101 structurally is a manifold, as subsequently will become more fully apparent as the description proceeds, and extends inwardly of gun chamber 135 to close the same as depicted at 102a. Depended from manifold portion 102a is a tube 105 which terminates in an orifice 106 through which beam 134 passes to engage the workpiece 50 as at 107. The beam thus performs its welding function in a first buffer chamber designated 108 and defined by the inner bellows 100. Buffer chamber 108 thus is orificed as at 106 with the high vacuum gun chamber 135, and is orificed as at 109 by the peripheral surface 103 disposed in releasable sealing engagement with the confronting surface of workpiece 50. The outer bellows 101 similarly defines a second buffer chamber designated 110 which is orificed as at 111 by the peripheral surface 104 also disposed in releasable sealing engagement with the confronting surface of the workpiece.

It will thus be seen that the high vacuum gun chamber 135 is shielded from atmospheric pressure by two orificed buffer chambers 108 and 110 which, being arranged in tandem in the manner of the buffer chambers of FIG. 1, tend to maintain progressively increased pressures with the result that intermediate buffer chamber 108 within which the welding occurs may be maintained at a substantial, although reduced order of vacuum with respect to the high vacuum of the gun chamber 135.

In order to produce the walking function of bellows 100 and 101, as aforedescribed, a pump 112, which may be a Kinney pump having a capacity of the order of 46 c.f.m., is employed to draw a vacuum on buffer chambers 108 and 110, the pump for this purpose acting through a duct 113 which communicates with chamber 108 and a duct 114 which communicates with chamber 110. A check valve 115 is disposed within duct 113, and a two position solenoid actuated valve 116 having open and closed positions is disposed within duct 114. A two position solenoid actuated valve 117 having closed and open positions and which is connected by a duct 118 to duct 114 is employed to inject helium from a source indicated by arrow 119 into chamber 110.

With valve 116 open and valve 117 closed, pump 112 operates to evacuate chambers 108 and 110 to establish the same substantially at the same vacuum of predetermined level. Valves 116 and 117 are then operated simultaneously to close valve 116 and open valve 117. When this occurs, helium at a pressure preferably in excess of atmospheric pressure passes through valve 117 and into chamber 110 to break the vacuum seal at 111, the seal at 109 meanwhile having been established. Pump 112 continues to maintain the vacuum in chamber 108 and check valve 115 prevents leakage into chamber 108 by way of valve 116. When the first one-half cycle of stepping movement is completed, valves 116 and 117 respectively are opened and closed simultaneously and pump 112 then proceeds, as before, to restore the vacuum within chamber 110 to near equality with the vacuum in chamber 108 to thus establish the vacuum seal at 111 and break the seal at 109 to complete the second half of the walking cycle.

It will be apparent that the welding system of FIG. 3 may advantageously be employed without walking the bellows 100, 101, as where suitable means is provided to release the vacuum in chamber 108 concurrently with the release of vacuum in chamber 110, such that the bellows are used to form a releasably sealed workbox adapted to be releasably sealed against a continuous non-apertured surface which may be the workpiece itself or a support therefor. In such an arrangement, a workpiece may be inserted and withdrawn from chamber 108 simply by breaking the seals at 109 and 111, and without inordinate loss of vacuum in the gun chamber, particularly where, as in FIG. 3, an additional buffer chamber 120 and its pumping system (not shown) is interposed between the gun chamber 135 and manifold 102a, as indicated by the dashed line partition 121 providing a first exit orifice 122 for beam 134.

Figure 4:
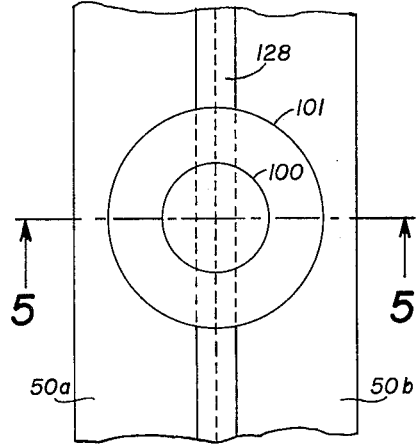
FIG. 4 is a schematic view of the walking seal shown in relation to a pair of abutting plates prepared for welding.
Figure 5:
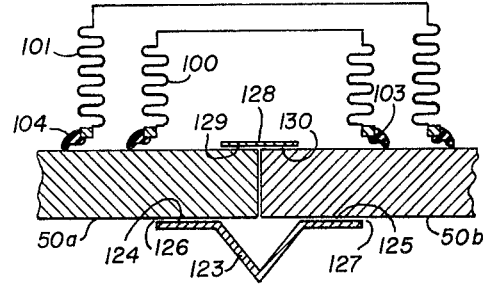
FIG. 5 is a sectional view taken along the line 5—5 of FIG. 4.

It will further be understood that certain preparatory steps must ordinarily be taken and seals in the nature of tooling aides must ordinarily be used on the workpiece in order to achieve entirely satisfactory results and quality welds in the use of the walking seal electron beam welder of FIG. 3. Since preparatory conditions will vary with the type and length of each joint to be welded, consider, for example, the task of butt welding the ½" plates 50a and 50b shown butted together in FIGS. 4 and 5 for fusion welding. Without sealing, a gap of the order of 0.002" is assumed between the abutting surfaces of the plates, this being equivalent approximately to an orifice of the order of 0.067" diameter in 7.0" of length. Pumping and buffering requirements are not considered practical for welding under these conditions. Accordingly, the joint is sealed as disclosed in FIGS. 4 and 5.

An elongated V formed sheet metal back up seal 123 is fastened behind the joint as by a suitable clamp, adhesive tape, or the like, and preferably by bonding the confronting surfaces at 124 and 125 with a suitable cement whereby the V member 123 is secured to the workpieces 50a and 50b in bridging relation to the gap. Additional sealing may take the form of adhesive and/or sealant applied along the edges 126 and 127. The ends (not shown) of the V member 123 are plugged with sealant.

An expendable elongated metal foil strip 128 of the order of 0.001" thick is fastened over the joint as by suitable adhesive and preferably by bonding the confronting surfaces at 129 and 130 whereby the foil is secured to the workpieces 50a and 50b in bridging relation to the gap therebetween. The beam will burn through the foil in welding, and the foil material therefore must be compatible with the welded material of the workpieces 50a and 50b.

The gaps at the ends (not shown) of plates 50a and 50b are closed and sealed as by weld tack or by use of a suitable sealant.

Under the foregoing sealed condition of workpieces 50a and 50b, during the beam walking and welding operation, chamber environment in the buffer and gun chambers is controlled by adequate pumping, and the joint material is essentially vacuum melted to thus enable the gun environment to be maintained. Some undercutting or beading at the weld may occur which may create a possible slight orifice beneath the sealing rings 103 and 104. Adequate flexibility and resiliency of the sealing rings, however, will minimize leakage beneath the rings to within the capability of pumps 112 and 137.

Figure 6:
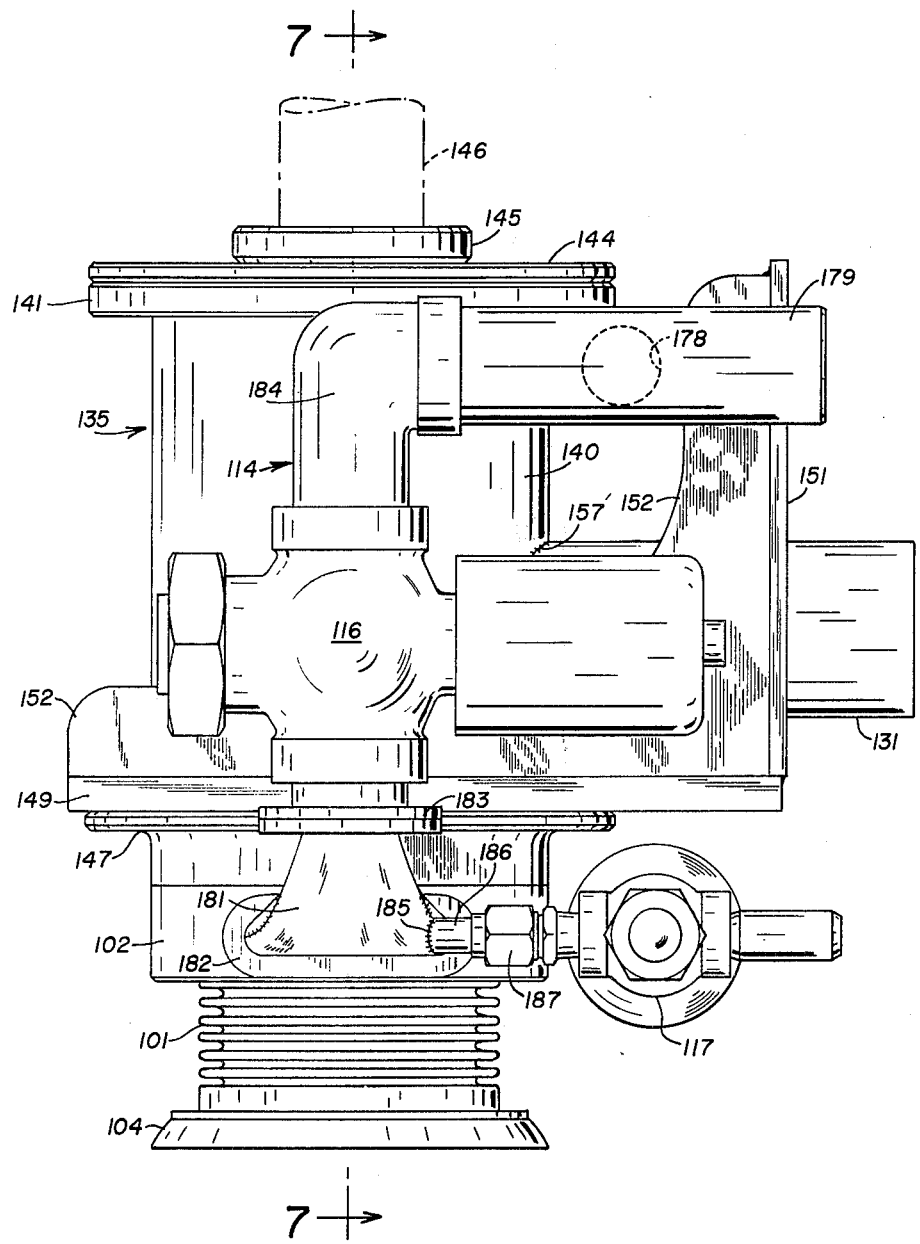
FIG. 6 is a view in elevation of the electron beam welder of the present invention in accordance with a preferred structural embodiment thereof.
Figure 7:
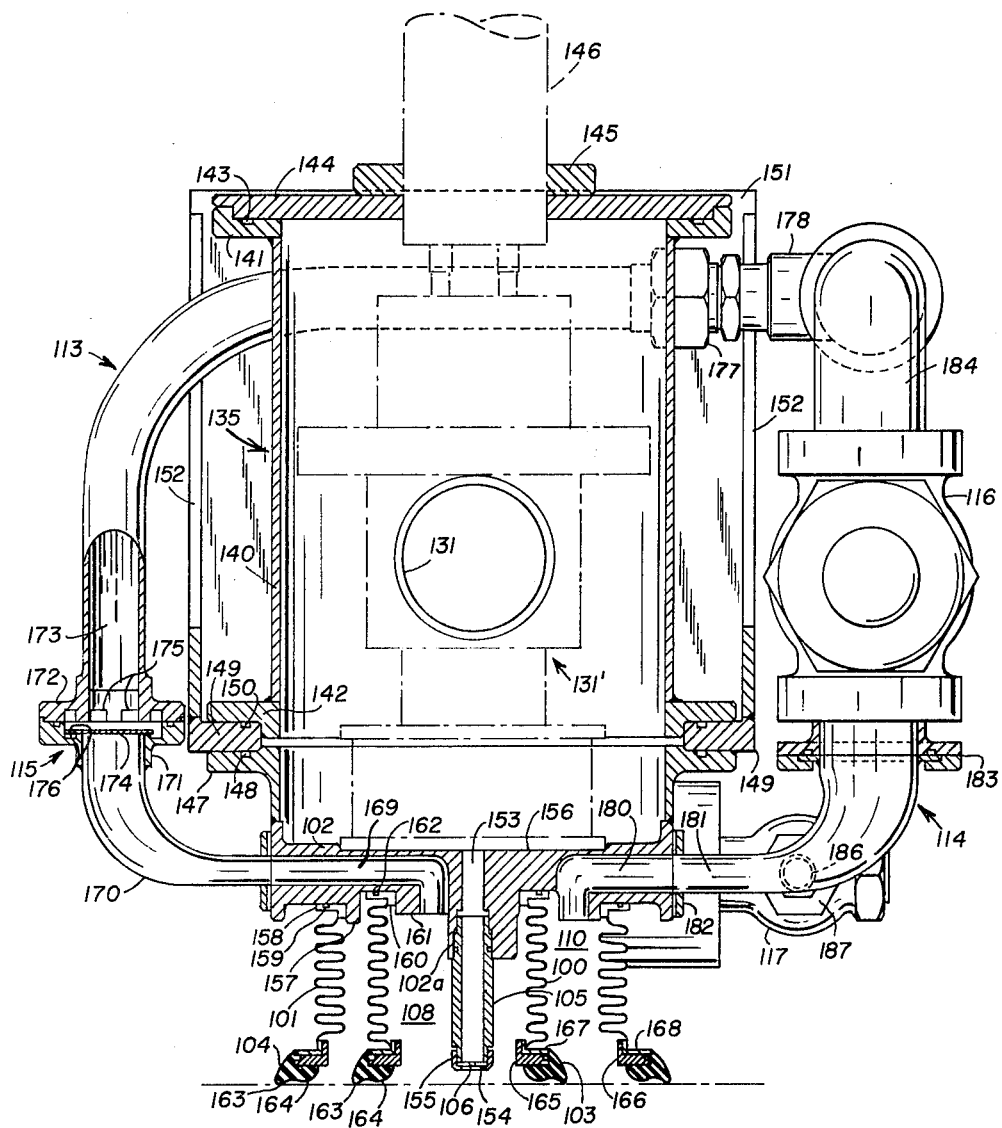
FIG. 7 is a sectional view of the welder taken substantially along the line 7—7 of FIG. 6.

Reference is now directed to FIGS. 6 and 7 which disclose a structural embodiment of the walking seal electron beam welder of FIG. 3. The electron gun is generally designated 131' and is depicted by the dashed lines in FIG. 7. The gun and associated apparatus may be of any type suitable for the purpose such, for example, as Sciaky type, specification No. 7185, with modified rating of 15 kw., 500 ma. power supply, 30 kv. gun, and associated components.

The electron gun chamber 135 for gun 131' is preferably formed of steel in upper and lower separable parts. The upper part comprises a cylindrical member 140 to which is secured, as by welding, upper and lower flanges 141 and 142 respectively. Upper flange 141 is recessed to receive a sealing ring 143 for engagement with a lid 144 which interfits, as shown, with the flange 141 such that, upon securing the lid to the flange by suitable fastening means (not shown), a vacuum tight seal is established between the flange and the lid. The lid is centrally apertured and carries a collar 145 for sealing the lid to the electrical connections 146 which are brought through the lid to the gun 131'.

The lower part of chamber 135 comprises a flange 147 which is suitably secured as by welding to manifold 102. Flange 147 is recessed and a centrally apertured supporting plate 149 is similarly recessed to receive sealing rings 148 and 150 respectively, the arrangement of the parts, as shown, being such that flanges 142 and 147, when interfitted and secured to plate 149 and to each other as by suitable fastening means (not shown), form a vacuum seal with the supporting plate. Plate 149, in turn, is suitably secured as by welding to an upstanding mounting plate 151, these plates, in turn, being reinforced by side gussets 152.

Manifold 102 forms the closure for the lower gun chamber part and additionally provides support for tube or barrel 105 which is suitably secured and sealed to and depended from manifold portion 102a. Portion 102a is centrally apertured as at 153 for passage of the beam through the manifold and tube 105. Orifice 106 is formed in a Pyrex window 154 which is suitably secured and sealed to tube 105 as by the open ended cap 155.

Gun 131' is supported on manifold 102 which is suitably recessed as at 156 for interfitting engagement with the gun. Duct 131 to which the diffusion pump 137 is connected, FIG. 3, makes a welded connection as at 157', FIG. 6, to chamber cylindrical wall 140.

Returning again to manifold 102, the same has a circular depending flange 157 which is concentrically disposed with respect to opening 153 and to which a flanged ring 158 is secured as by suitable fasteners (not shown). Ring 158 interfits, as shown in FIG. 7, with manifold 102 and its flange 157, and a sealing ring 159 carried by ring 158 is interposed between the parts to assure a vacuum seal therebetween. Bellows 101 which preferably is formed of stainless steel is suitably secured to ring 158 as by welding or brazing the parts together. For this purpose, the inner wall surface of the upper skirt, i.e., the upper cylindrical end portion of bellows 101, engages the outer surface of the flange on ring 158 as shown in FIG. 7.

Bellows 100 is similarly formed of stainless steel and similarly secured to a flanged mounting ring 160 which is secured to manifold 102 in interfitting relation with a depending hub 161 which is eccentrically positioned with respect to central opening 153. A sealing ring 162 assures a vacuum seal between the parts.

Seals 103 and 104 are formed of a suitable material such as neoprene for outer seal 104 and silicone for inner seal 103, both being of the order of 50 Shore. These seals preferably are each formed with a toe portion 163 and a heel portion 164. Toe portion or toe 163 depends relative to heel portion or heel 164 so as to be the first to engage a confronting surface, and comprises a relatively thin peripheral lip which readily yields to permit the heel 164 to engage and form a secondary peripheral seal with the confronting surface.

Seals 103 and 104 preferably are secured as by bonding to flanged metal supporting rings 165 and 166 respectively. These rings, in turn, are respectively secured by suitable fastening means (not shown) to similarly flanged metal rings 167 and 168. These metal rings are angular in cross section to facilitate their interconnection and to assure their sealing engagement with the seals, a portion of each of which is clamped between its associated rings as the rings are secured together. Rings 167 and 168 are suitably secured as by welding or brazing to the lower ends of bellows 100 and 101 respectively. For this purpose, the lower skirts, i.e., the lower cylindrical end portions of bellows 100 and 101 have their inner wall surfaces in engagement with the outer surfaces of the flanges on rings 167 and 168 respectively.

Bellows 100 may have an inside skirt diameter of the order of 2.9" for both its top and bottom cylindrical ends or skirts, and bellows 101 may have an inside skirt diameter of the order of 6⁹⁄₁₆" for its top cylindrical end or skirt and 6⅜" for its bottom cylindrical end or skirt, it being noted that the lower skirt of bellows 101 is aligned substantially with the outer convoluted wall surface of the bellows whereas its upper skirt is aligned with the inner convoluted wall surface of the bellows. Inner bellows 100 may have a convoluted length of the order of 2⅞" and a skirt length, top and bottom, of the order of ⅛". Outer bellows may have a convoluted length of the order of 2⅜" and a skirt length at the top of the order of ³⁄₁₆" and at the bottom of the order of ⁵⁄₁₆". The skirt length corresponds substantially to the flange length of the ring to which it is secured and conventionally is the longitudinal or axial dimension of the cylindrical end portion or skirt of the bellows.

With the foregoing bellows dimensions, the inner bellows 100 will have a lateral movement of the order of ½" minimum and an axial movement of the order of ⅛" minimum. Outer bellows 101 will have a lateral movement of the order of ⅜" minimum and an axial movement of the order of ⅛" minimum. The eccentric mounting of bellows 100, FIG. 7, enables maximum utilization of these lateral movements.

Returning again to manifold 102, the same has an opening 169 which opens into the top of inner bellows chamber 108, FIG. 7, and leads radially outwardly of the manifold to make connection with a duct 170, the duct and matching opening extending substantially circumferentially at their point of connection to reduce the impedance to flow on evacuation of chamber 108. Duct 170 undergoes a transition to circular cross section where it connects to a coupling flange 171.

A companion flange 172 for flange 171 connects to a duct 173 and the two flanges together form a housing for a butterfly type disc valve 174. The end of duct 170 provides a seat for valve 174 to thus close duct 170 when the pressure on the upper side of the valve disc 174 exceeds the pressure in chamber 108. Duct 173, on the other hand, is slotted as at 175 in its end portion, and the end of the duct is spaced from the end of duct 170. Thus, when the pump pressure is less than the pressure in chamber 108, valve 174 moves to engage the slotted end of duct 173 and the flow is unrestricted through the slotted end portion of the duct. Valve 174 has three equally spaced radial protuberances 176 to facilitate its movement and maintain its proper positions in the chamber afforded by flanges 171 and 172.

Ducts 170 and 173 form parts of duct 113, FIGS. 3 and 7, duct 173 making connection as by a coupling 177 to a short duct 178, in turn, connected with a duct 179 to which mechanical pump 112, FIG. 3, is connected. Flanges 171 and 172 and the duct end portions enclosed thereby taken together with butterfly valve 174 make up the check valve designated 115, FIGS. 3 and 7.

Manifold 102 has an opening 180 which opens into the top of outer bellows chamber 110 and leads radially outwardly of the manifold to make connection with a duct 181 having a flange 182 for securing the same to the manifold. Duct 181 and flange 182 extend substantially circumferentially of manifold 102, as best seen in FIG. 6, to reduce flow impedance. Duct 181 has a transition to circular cross section where it is connected as by the flanged coupling 183 to the solenoid actuated two position valve 116. Valve 116 is connected by the elbow 184 to duct 179. Duct 181 and elbow 184 make up the generally designated duct 114, FIGS. 3, 6 and 7.

Duct 181, adjacent flange 182, has connected thereto as by welding at 185, FIG. 6, a duct 186 which is connected as by the coupling 187 to the two position solenoid actuated valve 117.

From the foregoing it should now be apparent that a new and improved electron beam walking seal and welding method and system has been provided which is well adapted to fulfill the aforestated objects of the invention and while a preferred embodiment of this invention has been disclosed herein, other embodiments and modifications thereof are feasible to afford the full utility and results of which the present invention is capable. For example, the invention is not limited to electron beam welding of flat plate butt joints as hereinbefore described and disclosed, but also has application to the electron beam welding of overlap joints, T sections, tubes and cylinders, and similar configurations, wherein the parts to be welded present stepped, non-planar, contoured, or curved surfaces to the confronting bellows and their seals. In these applications, the bellows and seals may be stepped or contoured according to the configuration of the confronting workpiece surfaces and/or the workpiece surfaces may be built up with appropriate aids and seals to match the confronting surfaces of the bellows seals. Thus, for example, in the electron beam welding of an overlap joint between a pair of plates, the bellows and seals may be stepped in accordance with the different surface levels of the plates, or the joint may be leveled by using an aid in the form of an auxiliary plate suitably sealed to the bottom plate, thereby to present a single planar surface to the bellows seals as in the workpiece examples hereinbefore disclosed. In still other cases, joint leveling and surface matching to effect the required vacuum seals at the bellows-workpiece interface, may be accomplished in the use of specially formed aids in combination with specially shaped sealing rings.

Also contemplated are modifications and additions to the hereindisclosed electron beam welder in the form of a pressure sensitive switch and valve to automatically isolate the electron gun chamber and shut off beam power in the event of seal failure or to allow breaking the vacuum seal to permit weld inspection; an optical system including the aforementioned Pyrex window 154 in tube 105 to facilitate beam setup and adjustment while the system is under vacuum against a surface to be welded; the addition of mechanism to feed filler wire or rod when required to produce an acceptable weld joint; and whenever deemed beneficial, to provide supplementary pumping of the workpiece per se to prevent leakage therethrough.

It will be understood, therefore, that these and other examples, embodiments, and modifications of the invention may suggest themselves to those skilled in the art to which the invention most nearly appertains without departing from the scope of the invention as defined in the appended claims.

What is claimed and desired to be secured by Letters Patent of the United States is:

1. The method of walking inner and outer vacuum sealed cups over an engaging surface which comprises the steps of alternately reducing the vacuum within the outer cup substantially to atmospheric pressure thereby to break the vacuum seal of the outer cup and release the same for sliding movement with respect to the surface, and restoring the vacuum within the outer cup to substantial equality with the vacuum within the inner cup thereby to break the vacuum seal of the inner cup and release the same for sliding movement with respect to the surface.

2. The method of effecting a walking vacuum seal with a work surface which comprises the steps of engaging inner and outer vacuum cups with the work surface, evacuating said cups to establish a predetermined vacuum within the inner cup and a substantially equal vacuum within the outer cup whereby the inner cup is released for relative sliding movement with respect to the work surface, maintaining the vacuum within the inner cup while reducing the vacuum within the outer cup to substantial equality with the surrounding pressure outside the outer cup thereby to release the outer cup for relative sliding movement with respect to the work surface, re-evacuating the outer cup to restore the vacuum therewithin to substantial equality with the vacuum within the inner cup to again release the same for relative sliding movement with respect to the work surface, and repeating said steps of reducing and restoring the vacuum in the outer cup as long as relative movement is required between the cups and the work surface.

3. The method of effecting a walking vacuum seal between the surface of a workpiece and a tool for performing a continuous and progressive work function on the workpiece as the workpiece and tool move relative to each other, comprising the steps of enclosing the space between the tool and the surface of the workpiece with inner and outer open ended and tool supported chambers whose open ends respectively form releasable sealing engagements with the work surface and are movable laterally with respect to the tool, drawing a vacuum on said inner and outer chambers sufficient to perform the work function within the inner chamber and sufficient to substantially equalize the vacuum in the chambers whereby the sealed engagement of the inner chamber with the work surface is released to permit sliding movement of the inner chamber on said surface as the tool and workpiece move relative to each other, maintaining the vacuum within the inner chamber while reducing the vacuum within the outer chamber substantially to equality with the surrounding pressure outside the outer chamber whereby the sealed engagement of the outer chamber with the work surface is released to permit sliding movement of the outer chamber on said surface as the tool and workpiece continue to move relative to each other, restoring the vacuum within the outer chamber to substantial equality with the vacuum within the inner chamber to again release the inner chamber for sliding movement with respect to the work surface, and repeating said vacuum reducing and restoring steps as many times as required to complete said progressive work function along the workpiece.

4. The method of effecting a walking seal for the beam of an electron beam welder wherein welding occurs progressively on a relatively movable work surface outside the high vacuum of the electron gun chamber of the welder, said method comprising the steps of enclosing the region of the beam between the welder and the work surface with inner and outer vacuum cup chambers, evacuating said inner and outer chambers to a predetermined lower order of vacuum than the high vacuum within the electron gun chamber of the welder, and alternately reducing and restoring the vacuum in the outer cup chamber to near atmospheric pressure and substantial equality with the vacuum within the inner cup chamber respectively, thereby alternately to release said vacuum cup chambers for sliding movement with respect to said work surface as the welder and work surface move relatively with respect to each other.

5. The method as in claim 4 and including the additional steps of injecting a predetermined quantity of a protective gas into the outer cup chamber concurrently with the reduction of the vacuum therewithin to near atmospheric pressure.

6. The method of electron beam welding the butt joint of elongated metallic plates disposed outside the high vacuum environment of the electron gun of the welder, said method comprising the steps of sealing the butt joint on one side with a strip of metal foil bonded to the plates, sealing the opposite side of the butt joint with a V- channel bonded to the plates in bridging relation to the butt joint, directing the electron beam into the butt joint through said foil and through a first buffer chamber having a lower order of vacuum than said high vacuum environment of the electron gun and forming a vacuum seal with the surface of said plates and said foil sealed thereto, enclosing said first buffer chamber with a second buffer chamber of lower vacuum and forming a second vacuum seal with said foil and plates, and alternately reducing and restoring the vacuum in said vacuum buffer chamber to near atmospheric pressure and to near equality with the vacuum in said first buffer chamber respectively to alternately break the vacuum seals of said chambers whereby the welder and plates may be moved relative to each other to advance the beam progressively along the joint.

7. A walking seal comprising inner and outer vacuum cups, means for drawing a vacuum on said cups while positioned in releasably sealed engagement with the surface of a workpiece, and means for alternately reducing the vacuum of the outer cup to near atmospheric pressure surrounding said cup and restoring the vacuum therein to near equality with the vacuum within the inner cup respectively, thereby alternately to break the vacuum seals of said cups with said surface and permit sliding movement thereover in response to unitary movement of said cups relative to the workpiece.

8. A walking seal as in claim 7 and further comprising means for maintaining the vacuum within the inner cup when the vacuum seal of the outer cup is broken and when said vacuum drawing means operates to evacuate both said inner and outer cups.

9. A walking seal as in claim 7, said vacuum cups having a common base and having flexible walls providing lateral movement of the open ends of the cups parallel to said common base of the cups.

10. An electron beam system for continuous and progressive welding along a workpiece disposed outside the high vacuum environment of the electron gun and comprising, in combination, an electron beam welder having a high vacuum chamber, an electron gun disposed within said chamber, an orifice in the chamber, and means for directing the beam from said gun outwardly of the chamber through said orifice and onto a surface of the workpiece, inner and outer vacuum cups having a common base secured to said welder chamber with the center of the cups aligned substantially with said orifice in the chamber, said cups having open ends and resilient surfaces thereat for sealing engagement with said surface of the workpiece in surrounding relation to the region of impingement of the beam thereon, said open ends of the cups being movable parallel to said base of the cups, means operatively connected to said cups for drawing a vacuum therewithin of a lower order of vacuum than the high vacuum of said gun chamber, means operatively connected to said inner cup for preventing loss of vacuum therewithin by way of said vacuum drawing means, and means operatively connected to said outer cup for alternately reducing the vacuum therewithin to near atmospheric pressure surrounding the outer cup and restoring the vacuum in the outer cup to near equality with the vacuum maintained within the inner cup thereby alternately to release the open ends of said cups for sliding movement along the workpiece surface in response to relative movement between the welder and the workpiece.

11. An electron beam system as in claim 10, said vacuum drawing means comprising a vacuum pump and duct means separately interconnecting said cups and said pump, said means for preventing vacuum loss within the inner cup comprising a check valve disposed within the duct means individual to and connecting the inner cup.

12. A welding system as in claim 11, said means for alternately reducing and restoring the vacuum within the outer cup comprising first and second valves disposed within the duct means individual to and connecting the outer cup, said first valve being operable alternately to close and open the outer cup to said vacuum pump, and said second valve being connected to a source of helium under pressure and operable when the first valve closes to inject a quantity of helium from said source into the outer cup sufficient to reduce its vacuum to near atmospheric pressure.

13. A vacuum system as in claim 10, said vacuum drawing means comprising a vacuum pump, said common base for the cups comprising a manifold which supports said electron gun and provides a partial wall for said gun chamber, said manifold comprising a depending tube which terminates in said orifice, and said manifold having separate openings into said inner and outer cups for separate communication of the same with said pump.

14. A welding system as in claim 13, said inner and outer cups respectively comprising walls in the form of bellows secured separately at one end to said manifold and terminating at the other end in said resilient end surfaces.

15. A welding system as in claim 14, said resilient end surfaces comprising an outer peripheral toe and a somewhat less resilient inner peripheral heel.

References Cited by the Examiner

UNITED STATES PATENTS

| | | | |
|---|---|---|---|
| 1,749,765 | 3/1930 | Hendrickson | 219—74 |
| 2,053,417 | 9/1936 | Brace | 219—72 |
| 2,883,544 | 4/1959 | Robinson | 250—49.5 |
| 3,136,882 | 6/1964 | Radtke | 219—117 |
| 3,136,883 | 6/1964 | Radtke | 219—121 |

FOREIGN PATENTS

| | | |
|---|---|---|
| 1,326,248 | 3/1963 | France. |

RICHARD M. WOOD, *Primary Examiner.*

JOSEPH V. TRUHE, *Examiner.*